United States Patent
Kim

(10) Patent No.: US 6,744,567 B2
(45) Date of Patent: Jun. 1, 2004

(54) LENS FOR OPTICAL RECORDING AND REPRODUCING SYSTEM

(75) Inventor: Young-Sik Kim, Kyoungki-Do (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 10/092,677

(22) Filed: Mar. 5, 2002

(65) Prior Publication Data

US 2002/0126394 A1 Sep. 12, 2002

(30) Foreign Application Priority Data

Mar. 10, 2001 (KR) ........................... 2001/12458

(51) Int. Cl.[7] .............................................. G02B 13/18
(52) U.S. Cl. ...................... 359/719; 359/712; 359/718; 359/726
(58) Field of Search ................................ 359/712, 718, 359/719, 726, 729; 369/112.23, 112.29

(56) References Cited

U.S. PATENT DOCUMENTS 6,493,156 B1 * 12/2002 Oh et al. ..................... 359/742
2002/0136144 A1 * 9/2002 Hatano ..................... 369/112.23

FOREIGN PATENT DOCUMENTS

JP 2000-149317 5/2000 ........... G11B/7/135
JP 2002-244236 * 2/2001

* cited by examiner

Primary Examiner—Scott J. Sugarman
Assistant Examiner—Timothy J. Thompson
(74) Attorney, Agent, or Firm—Lee, Hong, Degerman, Kang & Schmadeka

(57) ABSTRACT

A lens for an optical recording and reproducing system includes: a plane of incidence on which a light generated from a light source is made incident; a first reflection side for reflecting a light passing through a plane of incidence; and a second reflection side for reflecting again the light that has been reflected on the first reflection side, the second reflection side being coated with a reflection material and being formed to be parabolic. The lens for an optical recording and reproducing system is very small in its size and weight, compared to the conventional lens for an optical recording system. In addition, the lens has a large numerical aperture and a less light loss by using one focussing lens without an objective lens, so that an information recording and reproducing efficiency can be heightened. Moreover, the height of the lens and the overall system where the lens is mounted can be remarkably reduced, so that the present invention provides an ultra-thin optical recording system that can be employed for a mobile instrument.

13 Claims, 5 Drawing Sheets

LENS FOR OPTICAL RECORDING AND REPRODUCING SYSTEM

BACKGROUND OF THE INVENTION

1. Field of the Invention

The present invention relates to an optical system for an optical recording and reproducing system, and more particularly, to an optical system for an optical recording and reproducing system that is capable of reducing a thickness and volume of a lens and of performing a ultra-high density information recording.

2. Description of the Background Art

In order for an optical recording medium or an optical magnetic recording medium to have a high density recording capacity, a bit (or a record mark) size should be small and a track width should become narrow.

However, since the spot size of a light focussed on a recording medium to form a bit on a record film of the recording medium is restricted by a diffraction limitation, it has a limitation to improvement of a recording density.

According to the tendency that a large amount of information is to be stored, a fresh optical recording/reproducing method is requested to overcome the limitation of the existing optical recording/reproducing method.

Recently, researches are being increasingly conducted on a near field recording/reproducing using a near field, because it is anticipated to remarkably enhance the recording capacity.

The near field optical recording and reproducing is based on the following principle.

As for a light made incident into a lens with an angle more than a critical angle, when it proceeds from a portion where a refractivity is dense to a portion where a refractivity is coarse, the light is totally reflected.

At this time, owing to the total reflection, an infinitesimal strength of light exists on the surface of the lens, which is called an evanescent wave or a dissipation wave. Use of the evanescent wave enables a high resolution which has been not possible due to an absolution limitation of the resolution, that is, a diffraction limitation, caused due to a diffraction phenomenon of light in the existing far-field.

In the near field optical recording and reproducing optical system, light is fully reflected within a lens to generate an evanescent wave on the surface of the lens, and a recording and reproducing is performed by a coupling of the evanescent wave and the recording medium.

FIG. 1 is a perspective view showing a near field optical recording is system 10.

A central portion of a disk 11, a recording medium, is mounted to be rotatable at a spindle motor (not shown) in a deck 18, and a recording and reproducing unit is installed at the portion therein.

At an upper surface of the disk a flying head slider 12 is supported by a suspension arm 14, and one side of the suspension arm is connected to a pick-up unit 17.

At a lower portion of the pick-up unit, a voice coil motor (VCM) 16 is installed, so that the pick-up unit can rotated at a certain range of angle.

Meanwhile, a fixing arm 13 is installed to be supported by the pick-up unit, and a prism 15 is installed at the end of the fixing arm.

Light generated from a light source (not shown) of the pick-up unit is changed in its path at the prism to pass the lens (not shown) mounted at the head slider and is finally made incident on the surface of the disk.

According to interaction between the incident light and the surface of the disk, light information can be recorded or reproduced.

FIG. 2 is a schematic enlarged view showing the optical system mounted at the head slider in the system of FIG. 1.

The optical system includes a hemispheric solid immersion lens (SIL) 22 and a first condensing lens 21.

The SIL is formed hemispheric shape of which an upper portion is spherical and a lower surface is plane, and it is installed so that the center of the plane portion of the SIL corresponds to a focus of the first condensing lens.

Accordingly, the light 24 made incident on the first condensing lens is refracted to be collected at the center of the lower plane portion of the SIL.

In order to record a data (a bit) on the disk by using the SIL, as shown in FIG. 2, the SIL comes near the surface of the recording medium 23 with very small space, that is, for example, with a space of 10~70 nm.

Then, an optical near field phenomenon takes place that a portion of the optical energy first focussed at the lower surface of the SIL is transferred to the recording medium. Thanks to the near field phenomenon, it is possible to record or reproduce a data in or from the surface of the recording medium.

For example, the energy transferred from the SIL heats a portion of the surface of the recording medium, causing a local phase change. Bits are formed on the surface of the recording medium owing to the phase change. That is, information is recorded.

In case of reading information, a characteristic that a refractivity differs at the portion where the phase change has been made locally is used. A light having a lower strength than that of a light for recording is made incident through the SIL, and then the strength of the light coming through the SIL after being reflected on the surface of the recording medium is measured by means of an optical sensor. Then, since the refractivity differs according to existence and non-existence of bit, information can be read.

Though the conventional optical system using the SIL has an advantage that a diffraction limitation of light is overcome and light spot can be reduced, it also has the following problems.

That is, generally, an aberration that a light is not focussed to one point occurs in the optical lens. The aberration has a characteristic that it becomes greater as the magnification of a lens is higher.

Since the optical system using the SIL requires a first condensing lens of a large magnification, the aberration of the first condensing lens much degrades a first condensing performance of the optical system.

In addition, since the data recording and reproducing lens using the SIL requires the first condensing lens, the device is enlarged in its volume and complicated, and it is difficult to assemble an entire data storing unit and the first condensing lens.

Especially, since there is a limitation to reducing the height of a head slider where the lens is mounted, it is difficult to manufacture an ultra-thin optical recording and reproducing system that can be mounted at a mobile instrument.

SUMMARY OF THE INVENTION

Therefore, an object of the present invention is to facilitate assembling of an optical system and an entire system by reducing a volume and a thickness of the optical system, to thereby provide an ultra-slim optical recording and reproducing system.

Another object of the present invention is to provide an optical system for an optical recording system that is capable of recording and reproducing information only by using a focusing lens without a condensing lens.

To achieve these and other advantages and in accordance with the purpose of the present invention, as embodied and broadly described herein, there is provided a lens for an optical recording and reproducing system including: a plane of incidence on which a light generated from a light source is made incident; a first reflection side for reflecting a light passing through a plane of incidence; and a second reflection side for reflecting again the light that has been reflected on the first reflection side, the second reflection side being coated with a reflection material and being formed to be parabolic.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, a lens basically includes the first reflection side, the second reflection side and a plane of incidence, and may be modified to have a structure that has more sides other than the three sides according to a user purpose and an application field.

A light coming to a plane of incidence from a light source is reflected on the first reflection side and the second reflection side and converted at a focal point of the parabolic side formed on the first reflection side. The spot of the converged light can be adjusted by controlling the size of the portion corresponding to the focal point of the parabolic side. Accordingly, a high density optical recording and reproducing can be performed.

The optical system of the present invention can be adopted to the existing system using the far-field as well as the optical recording and reproducing system using a near field.

Figure 1:
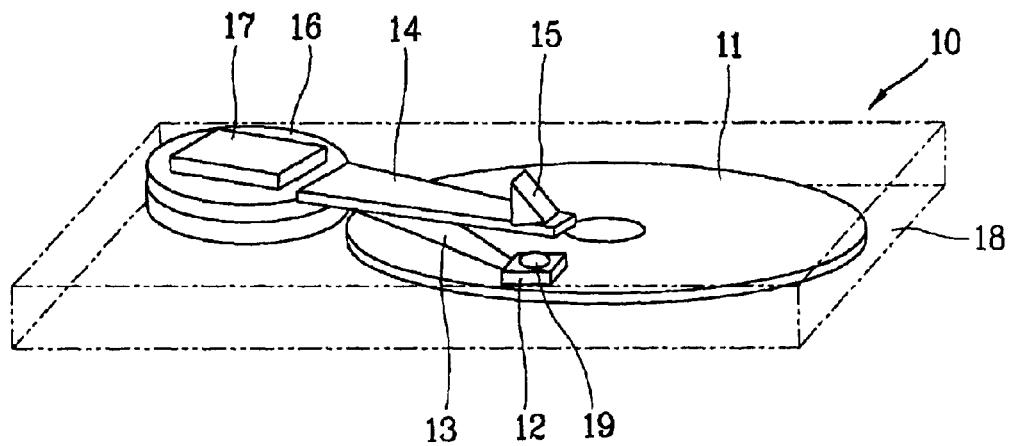
FIG. 1 is a perspective view showing a near field optical recording system in accordance with a conventional art.
Figure 2:
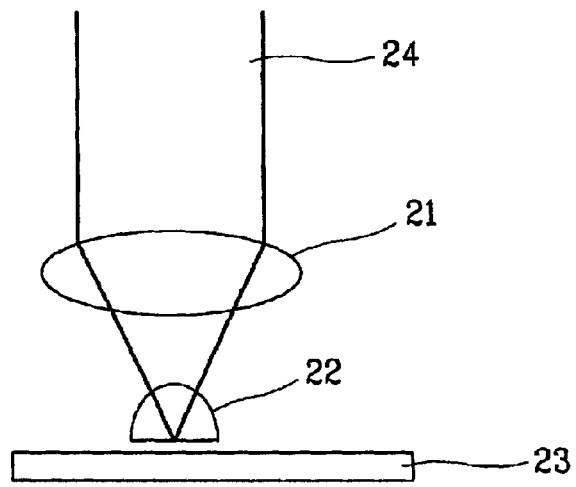
FIG. 2 is a schematic enlarged view showing an optical system mounted at a head slider in the near field optical recording system of FIG. 1 in accordance with the conventional art.
Figure 3A:
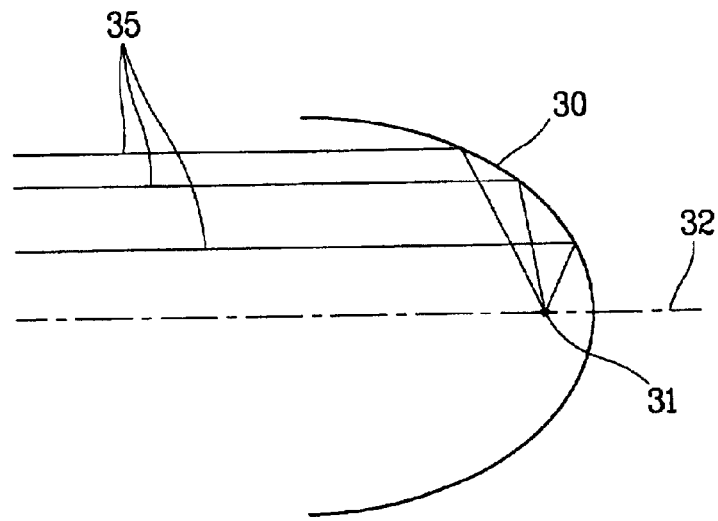
FIG. 3A is an explanatory schematic view showing a principle of the present invention.

FIG. 3A is an explanatory schematic view showing a principle of the present invention, in which a section of a parabolic side mirror 30 is shown.

A characteristic of a parabola is that lights made incident in parallel to the axis of the parabola are all converted into the focal point of the parabola.

Accordingly, as shown in FIG. 3A, the lights 35 made incident in parallel to the axis 32 of the parabolic side are converted to the focal point 31 of the parabolic side 30.

Figure 3B:
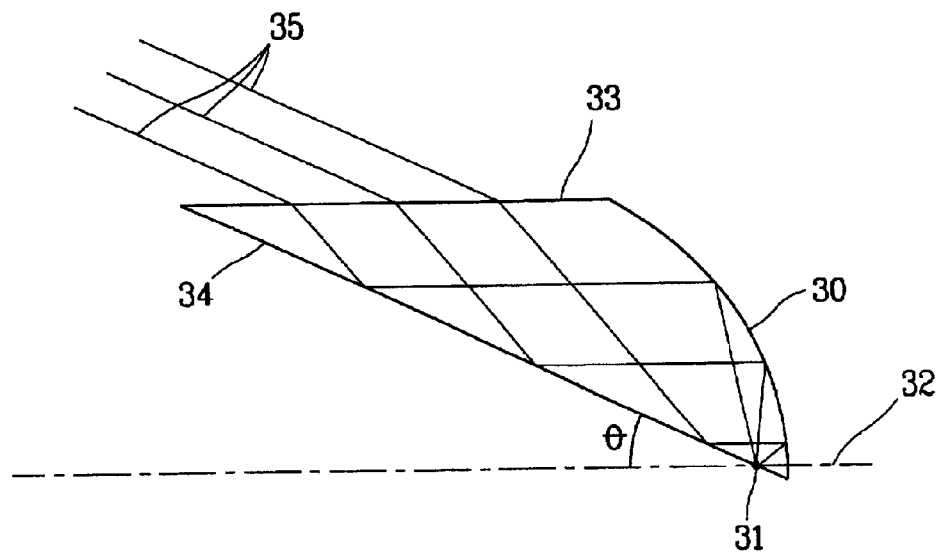
FIG. 3B is a sectional view showing a lens in accordance with a first embodiment of the present invention.

FIG. 3B is a sectional view showing a lens in accordance with a first embodiment of the present invention, in which a parabolic lens adapting the parabolic mirror of FIG. 3A.

The lower surface 34 of the lens is tilted maintaining a certain angle $\theta$ with respect to the axis 32 of the parabolic side 30, and a reflection material is coated on the parabolic side.

The lower surface 34 of the lens is extended to pass the focal point 31 on the axis 32 of the parabola side and meets the parabolic side. The upper surface 33 of the lens is formed by being cut from one end of the parabola side, which meets the lower surface 34 of the lens.

The light is made incident on the upper surface 33 of the lens. When the light 35 is made incident, the incident beam is refracted with a certain angle according to a refractivity of the lens and reaches the lower surface 34 of the lens corresponding to the first reflection side.

The light reaching the lower surface of the lens is totally reflected due to the refractivity difference with the lens and directed to the parabola side 30 corresponding to the second reflection side.

In order for the light directing to the parabola side to be converged to the focal point 31 of the parabola side, the light should proceed in parallel to the axis 32 of the parabola side.

Accordingly, the angle at which the light generated from a light source is made incident on the upper surface 33 of the lens is determined in such a manner that the incident beam is totally reflected from the lower surface of the lens and proceeds in parallel to the axis 32 of the parabola side of the lens.

Figure 4:
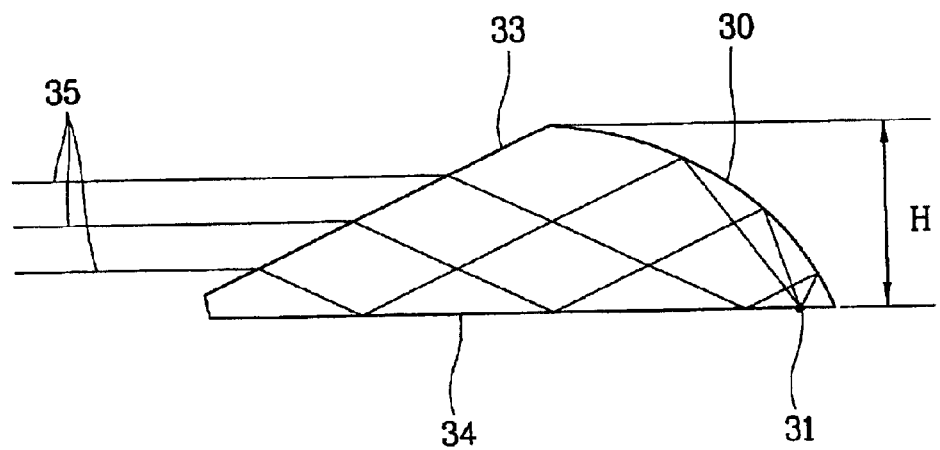
FIG. 4 is a sectional view showing a lens that has been changed in its position of FIG. 3B in accordance with one embodiment of the present invention.

FIG. 4 is a sectional view showing a lens that has been changed in its position of FIG. 3B in accordance with one embodiment of the present invention, in which the lower surface 34 of the lens is level with the bottom surface.

Substantially, the lens is preferably installed at the head with this position in the optical recording system, because light generated from the light source can be horizontally made to the lens incident portion.

The lens of the present invention as shown can make a light of a small spot by using only a focussing lens without an objective lens.

In addition, the height (H) of the lens is very low, and preferably, it can be fabricated to have a height of below 0.3 mm, ensuring an ultra-thin type system with an optical recording system of which overall thickness is considerably reduced.

Besides, the lens of the present invention can make light to directly be incident on the incident portion, without a necessity of a converting unit such as a prism to change a path to make a light to be incident on the incident portion of the lens from the light source, so that the height and weight of the head portion where the lens is mounted can be reduced, and accordingly, a load of the driving unit for driving the head portion can be reduced.

Meanwhile, the size of the lens incident portion can be varied by designing a lens by controlling the tilt angle θ as shown in FIG. 3B.

For example, by making the tilt angle bigger, the size of the incident portion can be reduced, and thus, a diameter of light generated from the light source can become small, reducing the size of an entrance pupil.

Accordingly, the size of the light source and a power consumption can be reduced, resulting in that the size of the overall system and overall power consumption can be reduced.

The embodiment of FIG. 4 can be modified in such a manner that the bottom surface of the lens can be cut to a certain thickness so that a focal point of a parabola side can be formed at a portion lower than the bottom surface of the lens.

In this modification, since a focal point substantially formed by an incident beam is positioned lower than the bottom surface of the lens, even if a foreign substance such as dusts is introduced in a small space between the recording medium and the lens, it has no influence to recording and reproducing.

Figure 5:
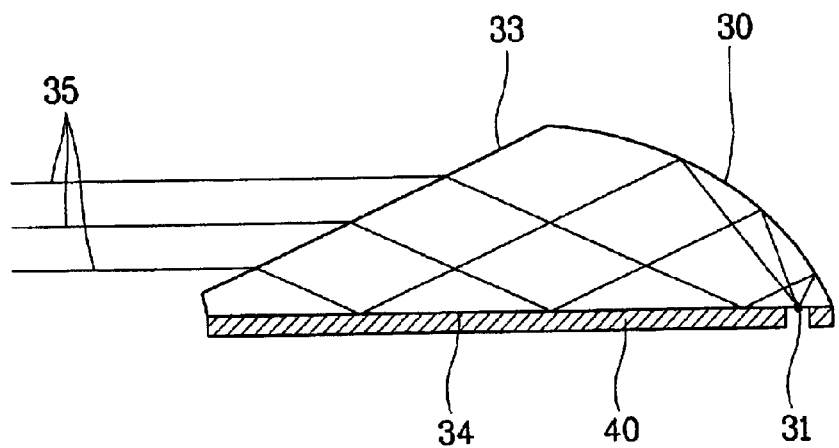
FIG. 5 is a drawing illustrating a lens with a reflection material coated at the lower surface in accordance with a second embodiment of the present invention.

FIG. 5 is a drawing illustrating a lens with a reflection material coated at the lower surface in accordance with a second embodiment of the present invention.

As shown in FIG. 5, a reflection material 34 is coated at the bottom surface 34 of the lens except for the focal point portion of the parabola side of the lens.

The light which has passed the plane of incidence is totally reflected at the bottom surface of the lens, but in this respect, it may occur that a portion of the light is transmitted through the bottom surface of the lens, which works as a noise to recording and reproducing of optical information. Thus, by coating the reflection material at the bottom surface of the lens, the transmitted light can be removed.

Figure 6:
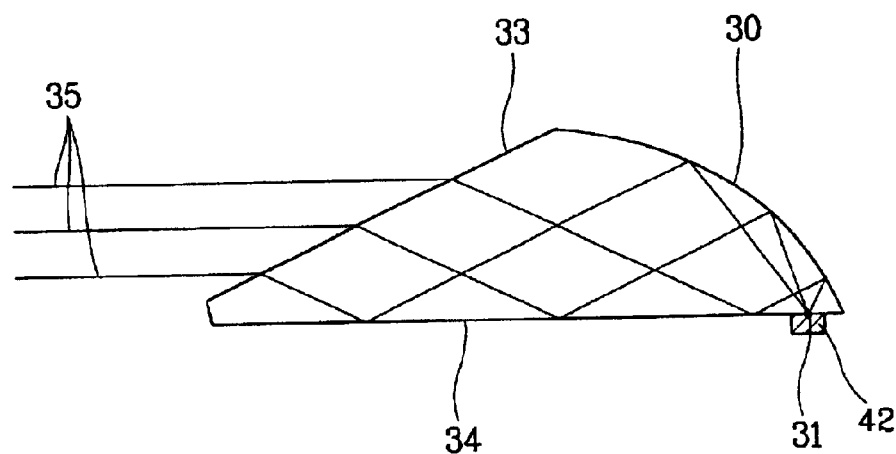
FIG. 6 is a drawing illustrating a lens forming a step at a focal point portion of a parabolic side in accordance with a third embodiment of the present invention.

FIG. 6 is a drawing illustrating a lens forming a step at a focal point portion of a parabolic side in accordance with a third embodiment of the present invention.

Unlike the embodiment of FIG. 5, it is noted that a step 42 is formed at the portion of the focal point of the parabola side of the lens.

Formation of the step can prevent a bad influence to recording and reproducing information since an optical interaction takes place between the portion where the total reflection is made other than the focal point of the bottom surface of the lens and the recording medium.

The material to form the step should be a transparent material so as to transmit light, and the step is preferably formed to have a size of about 0.1~100 nm, so that it may not cause a trouble to recording and reproducing of information.

Figure 7:
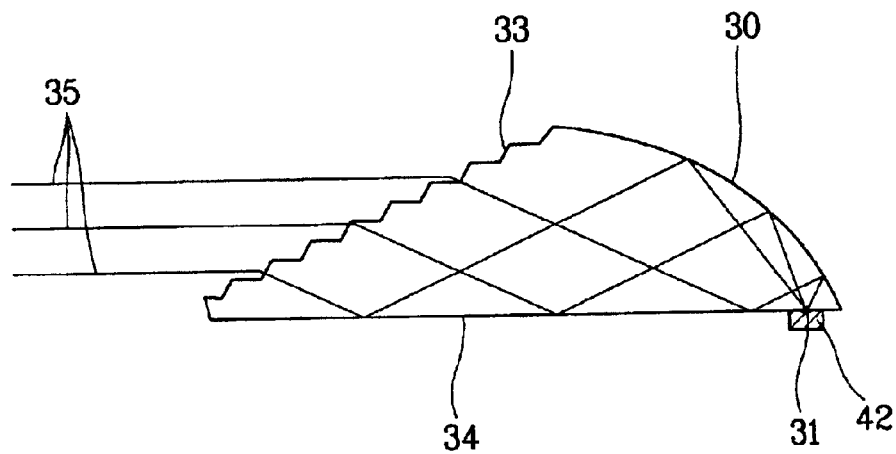
FIG. 7 is a drawing illustrating a lens with a hologram formed at the plane of incidence in accordance with a fourth embodiment of the present invention.

FIG. 7 is a drawing illustrating a lens with a hologram formed at the plane of incidence in accordance with a fourth embodiment of the present invention.

As shown in FIG. 7, a hologram is formed at the plane of incidence 33 of the lens.

The hologram formed at the plane of incidence allows a diffraction angle and wavefront aberration to be controllable, so that a tolerance margin can be great, and in this aspect, the hologram is advantageous.

In addition, the hologram can reduce a loss of light coming to the plane of incidence, allowing a large numerical aperture.

Figure 8:
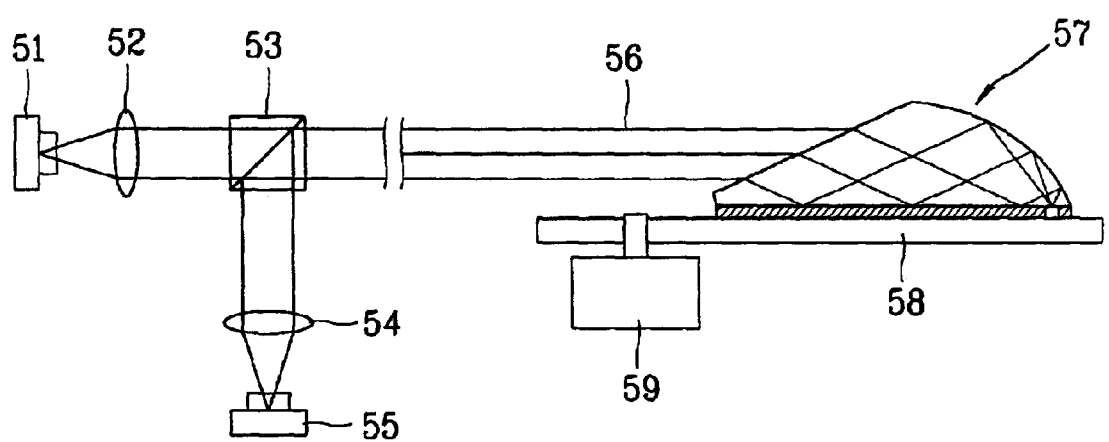
FIG. 8 is a schematic view showing the construction of an optical recording and reproducing system having the lens in accordance with a preferred embodiment of the present invention.

FIG. 8 is a schematic view showing the construction of an optical recording and reproducing system having the lens in accordance with a preferred embodiment of the present invention.

The light generated from the light source 51 is converted into a parallel beam as it passes a collimation lens 52, and reaches the focussing lens 57 after passing through a beam splitter 53.

The light converted to the focussing lens makes an optical magnetic interaction with the surface of the recording medium 58 being rotated by the motor 59, to thereby record or reproduce information.

Information reproduction is performed in such a manner that a light reflection from the recording medium 59 passes the focussing lens 57, reaches the beam splitter 53, is separated to a different direction to the incident beam, passes the collimation lens 54 and is sensed by an optical sensing unit 55.

In FIG. 8, the focussing lens 57 is illustrated relatively large, but actually it is very small and mounted at the head portion (not shown) of a system.

Since the size and weight of the lens is very small, servo of the lens is very easy in the system, and the lens of the present invention can be adopted to both to an integrated type pick-up and to a separated type pick-up.

In addition, in order to mount the lens, the head of a hard disk can be used as it is, so that an access time can be reduced.

As so far described, the lens for an optical recording and reproducing system of the present invention has the following advantages.

That is, for example, the lens for an optical recording and reproducing system of the present invention is very small in its size and weight, compared to the conventional lens for an optical recording system.

Especially, the present invention provides an optical system that has a large numerical aperture and a less light loss by using one focussing lens without an objective lens, so that an information recording and reproducing efficiency can be heightened.

In addition, the height of the lens and the overall system where the lens is mounted can be remarkably reduced, so that the present invention provides an ultra-thin optical recording system that can be employed for a mobile instrument.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. A lens for an optical recording and reproducing system, the lens comprising:

a plane of incidence on which a light generated from a light source is made incident;

a first reflection surface for reflecting the light passing through a plane of incidence; and a parabolic second reflection surface for reflecting the light that has been reflected by the first reflection surface, the second reflection surface having a focal point and axis of symmetry and coated with a reflection material;

wherein, the first reflection surface forms an angle with the axis of symmetry and extends beyond the focal point.

2. The lens of claim 1, wherein the focal point is positioned on the first reflection surface.

3. The lens of claim 2, wherein reflection material is coated at a portion other than a region on the first reflection surface that surrounds the focal point.

4. The lens of claim 2, wherein a step is formed at the focal point on the first reflection surface.

5. The lens of claim 4, wherein the step is approximately 0.1 to 100 nm in height.

6. The lens of claim 1, wherein a hologram is formed at the plane of incidence.

7. The lens of claim 1, wherein the focal point is positioned below the first reflection surface.

8. A lens for an optical recording and reproducing system, the lens comprising:

a plane of incidence on which a light generated from a light source is made incident;

a first reflection surface for reflecting a light passing through a plane of incidence; and a parabolic second reflection surface for reflecting the light that has been reflected by the first reflection surface, wherein the second reflection surface has a focal point positioned on the first reflection surface and is coated with reflection material; and wherein the first reflection surface forms an angle with the axis of the second reflection surface and extends beyond the focal point.

9. The lens of claim 8, wherein reflection material is coated at a portion other than a region on the first reflection surface that surrounds the focal point.

10. The lens of claim 9, wherein a step is formed at the focal point on the first reflection surface.

11. The lens of claim 10, wherein the step is approximately 0.1 to 100 nm in height.

12. The lens of claim 8, wherein a hologram is formed at the plane of incidence.

13. The lens of claim 8, wherein the focal point is positioned below the first reflection surface.

* * * * *